United States Patent [19]

Yao et al.

[11] 3,829,263
[45] Aug. 13, 1974

[54] APPARATUS FOR REDUCED PRESSURE CASTING OF SYNTHETIC RESINS

[75] Inventors: Ching-Chun Yao; Hitoshi Tsuchiya, both of Tokyo, Japan

[73] Assignee: Rion Kabushiki Kaisha, Tokyo, Japan

[22] Filed: July 10, 1972

[21] Appl. No.: 270,064

[52] U.S. Cl............ 425/145, 425/147, 425/DIG. 60
[51] Int. Cl............................................. B29c 6/00
[58] Field of Search .......... 425/145, 149, 146, 147, 425/405 R, DIG. 60, 251, 250, DIG. 803, 247, 249, 447, 117; 264/101, 102

[56] References Cited
UNITED STATES PATENTS

| | | | |
|---|---|---|---|
| 2,437,703 | 3/1948 | Moncrieff | 425/147 X |
| 2,991,506 | 7/1961 | Crandall | 425/250 X |
| 3,267,517 | 8/1966 | Altermatt | 425/447 |
| 3,538,549 | 11/1970 | Hehl | 425/145 |
| 3,555,620 | 1/1971 | Bucy | 425/149 |
| 3,640,663 | 2/1972 | Hampel et al. | 425/405 X |

Primary Examiner—J. Spencer Overholser
Assistant Examiner—David B. Smith
Attorney, Agent, or Firm—Wenderoth, Lind & Ponack

[57] ABSTRACT

Workpieces to be encapsulated are put in place within cavities of a plastic mold one for each cavity. A container in which the mold is disposed is evacuated to a predetermined reduced pressure. At that time a liquid mixture of a snythetic resin and its hardener at room temperature begins to be sucked into the cavities to fill them. When the mixture escapes from the cavities through their escaping ports, the mixture supply is disconnected and the mold returns to the surrounding pressure. Then the resin solidifies into solids each encapsulating the individual workpiece.

1 Claim, 11 Drawing Figures

PATENTED AUG 13 1974 3,829,263

APPARATUS FOR REDUCED PRESSURE CASTING OF SYNTHETIC RESINS

BACKGROUND OF THE INVENTION

This invention relates to a method of and a device for casting synthetic resins in the form of liquids under reduced pressures and even at room temperature.

Heretofore, it has been a common practice to pour synthetic resins in the form of liquids, for example, epoxy or polyester resins into predetermined molds to be solidified into required shapes which is called "casting" and also to bring such resins into the solid state in which they hermetically enclose articles having different shapes. The latter measure may be called "potting," "encapsulating" or "sealing." In the electronic components industry those measures have encountered many problems relating to the workability and mass productivity thereof. Recently, there has come into the limelight a technique utilizing transfer molding in reduced pressures or vacuums for hermetically enclosing electronic elements with synthetic resins. Certainly, the transfer molding is advantageous in that it utilizes a lower molding pressure than the injection and compression molding process but it is still requires a pressures of from 10 to 110 kg/cm$^2$ at a temperature above 160° C. This has led to the disadvantages that electronic parts involved may be damaged or deteriorates due to the use of the pressure and temperature just mentioned. It is particularly noted that there are a multiplicity of electronic parts and elements incapable of withstanding a molding temperature of 160° C. For example, piezoelectric elements formed of Rochelle salt have a melting point of 55° C and a maximum permissible temperature of 45° C, in addition to being deliquescent and efflorescent. Thus it will be appreciated that transfer molding can not be used to hermetically enclose such piezoelectric elements with synthetic resins.

Furthermore, a wide variety of electronic parts and elements have been recently developed having improved characteristics and smaller sizes than those previously produced. Some of these newly developed parts and elements are incapable of withstanding the molding pressures employed in the transfer molding but also it is difficult to completely seal them with synthetic resins through the use of the known molding techniques as above described because it has been difficult to uniformly inject synthetic resins in the form of liquids into slits or gaps as small as on the order of 0.1 to 0.05 mm that may be included in the electric parts and elements.

SUMMARY OF THE INVENTION

Accordingly it is an object of the invention to provide a new and improved method of and device for casting synthetic resins in the form of liquids under reduced pressures and even at room temperature, which method is particularly suitable for hermetically enclosing small electronic components that may be otherwise physically and/or chemically damaged whereby the workability, mass productivity and preservation of performance of the products being excellent.

The invention accomplishes this object by the provision of a method of casting a synthetic resin in the form of a liquid to hermetically enclose workpieces, comprising the steps of putting the workpieces in place within cavities of a mold one workpiece for each cavitiy, and pouring a liquid mixture of a synthetic resin and a hardener therefor in predetermined proportions and at room temperature into the mold cavities to enclose the workpiece in each of the cavities in solid state, characterized in that the mold is reduced to a predetermined pressure and the liquid mixture of synthetic resin and hardener is sucked into the mold cavities under the reduced pressure at room temperature to completely fill the cavities, and thereafter the mold is returned to the surrounding pressure to leave the mixture filling the cavities to solidify.

The mold may be preferably formed of a plastic which is easily separated from solid synthetic resin.

A preferred device for carrying out the method of the invention may comprises pot means including therein an amount of a liquid mixture of a synthetic resin and a hardner therefor having those components in a predetermined proportion at room temperature, a container wherein the pressure may be reduced, a mold having workpieces to be encapsulated put in place within cavities thereof and removably disposed in the container, a normally closed electromagnetic valve through which the pot means is connected to the mold, a vacuum pump for evacuating the container, another electromagnetic valve disposed between the vacuum pump and the container and having a first operating position where the container is operatively connected to the vacuum pump and a second operating position where the container communicates with the surrounding air, pressure sensor means for sensing when a predetermined reduced pressure is achieved within the container to open the first electromagnetic valve to cause the liquid mixture from the pot means to be sucked into the mold cavities, and means responsive to the complete filling of the mold cavities with the liquid mixture to close the first electromagnetic valve while stopping the vacuum pump and turning the second electromagnetic valve from its first to its second operating position to return the pressure in the container to the surrounding pressure.

In order to determine when the liquid mixture of synthetic resin and hardener completely fills the mold cavities, the latter may be advantageously provided with respective escaping ports opening to the outer surface of the mold and switching means such as a limit switch may disposed adjacent a seleced one of the escaping ports within the container to respond to the overflow of the mixture from the mold through the selected escaping port to close the first valve while stopping the vacuum pump and turning the second electromagnetic valve from its first to its second operating position.

BRIEF DESCRIPTION OF THE DRAWINGS

This invention will become more readily apparent from the following detailed description taken in conjunction with the accompanying drawings in which.

DESCRIPTION OF PREFERRED EMBODIMENTS

Figure 1:
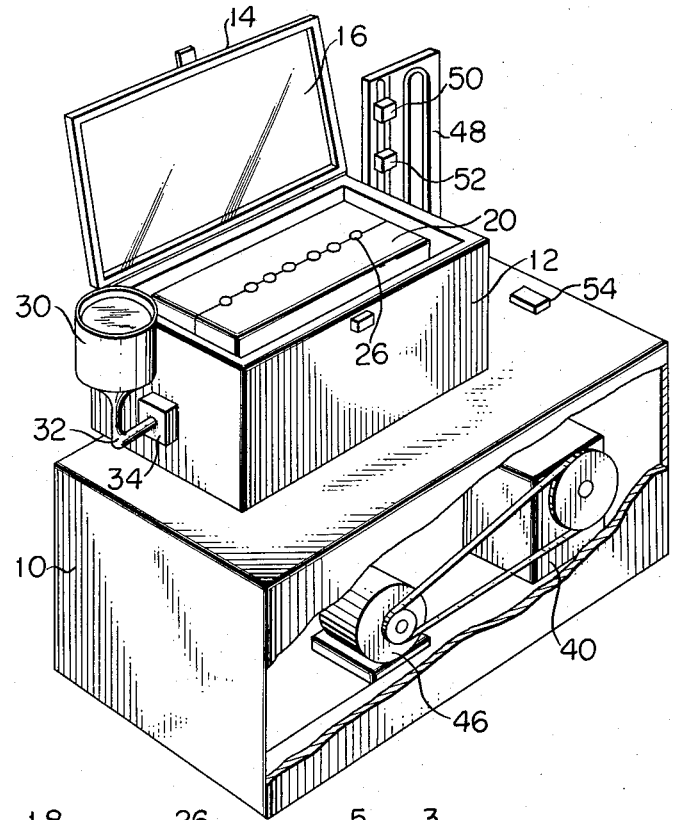
FIG. 1 is a perspective view of a reduced-pressure casting device constructed in accordance with the principles of the invention with a part broken away.

Referring now to the drawings and FIG. 1 in particular, it is seen that an arrangement disclosed herein comprises a machine box 10 and a container 12 in the form of a rectangular box disposed upon the machine box 10. The container 12 is open at its upper face as viewed in FIG. 1 and is adapted to be closed with a cover plate 14 that is preferably panelled with plate of transparent glass 16 for the purpose of observing the interior of the container 12. Also the glass plate 16 is required to withstand an external pressure applied thereto in order that in operation the container is maintained under a reduced pressure or a vacuum. The cover plate 14 is shown in FIG. 2 as closing the upper face of the container 12 with a packing 18 interposed therebetween ensuring that the container 12 is maintained in a reduced pressure or a vacuum.

Figure 2:
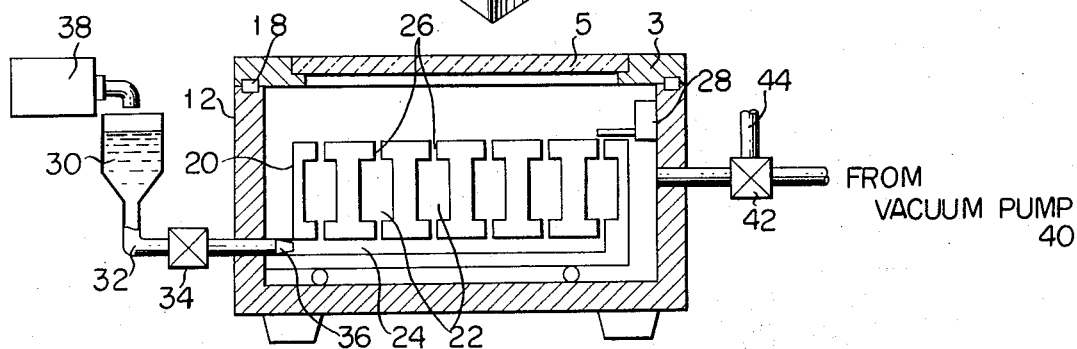
FIG. 2 is a longitudinal sectional view of one portion of the device shown in FIG. 1 as taken along the line II — II of FIG. 1 with the associated components illustrated in elevation.

As best shown in FIG. 2, a mold 20 is removably disposed within the container 12 and has a plurality of mold cavities 22 disposed in longitudinally spaced aligned relationship, a runner 24 disposed on the bottom portion thereof in communication with all the mold cavities 22, and an escaping port 26 communicating with each of the mold cavities 22 and opened on the upper surface of the mold 20. The cavities 22 have a dimension and shape predetermined by the particular workpieces to be encapsulated. A limit switch 28 is shown in FIG. 2 as being disposed on an internal wall surface of the container 12 immediately above the escaping port 26 at the righthand end for a purpose as will be apparent hereinafter.

The mold 20 is preferably formed of a plastic material which is inexpensive facilitates the mass production thereof while being readily separable from particular castings. Examples of such a material include polypropyrens, polyethylenes, polyvinyl chlorides, silicone resins etc. The the mold is advantageously of a structure easily assembled and disassembled.

A pot 30 for containing an amount of resinous material in the form of a lquid to be cast is connected at the bottom to a conduit 32 having a normally closed electromagnetic valve 34 disposed therein. The conduit 32 is removably sealed through the adjacent side wall of the container 12 until it terminates at a pouring nozzle 36 snugly fitted into the runner 24 of the mold 20. The valve 34 serves to control the amount of the resinous material poured into the mold 20. A combined weighing and mixing unit 38 is disposed adjacent and above the pot 30 to prepare a liquid mixture including a synthetic resin and a hardener therefor in predetermined proportions at room temperature and to cooperate with a level regulator (not shown) disposed within the pot 30 to supply the liquid mixture to the pot 30 so as to maintain its level substantially constant within the pot. The proportion of the hardener relative to the synthetic resin is variable for the particular purpose and the liquid mixture may be somewhat above room temperature to have the optimum viscosity for pouring purposes.

However the combined weighting and mixing unit and the level regulator are well known in the art and form no part of the invention so that they need not be described further herein.

In order to evacuate the container 12 hermetically closed with the cover plate 14, a source of reduced pressure or vacuum such as a vacuum pump 40 is connected by a line to the interior of the container 12 through an electromagnetic valve 42 of the three way cock type. The valve 42 has a first operating position where the container 12 is operatively connected to the vacuum pump 40 and a second operating position where the container communicates with a feed air line 44. When the feed air pipe 44 communicates with the interior of the container 12 through the valve 42, the container 12 is restored to atmospheric pressure whereupon the cover plate 12 is adapted to be automatically moved to its open position as shown in FIG. 1 by any suitable means (not shown).

As shown in FIG. 1, the vacuum pump 40 is suitably disposed within the machine box 10 to be driven by an electric motor 46 also disposed within the same box. On that side of the container 12 opposite to the pot 30 a U-shaped mercury manometer 48 is disposed upon the machine box 10 so that the open leg of the "U" communicates with the interior of the container 12 in order to indicate a pressure or a degree of vacuum within the container 12. Also FIG. 1 illustrates a pair of small blocks 50 and 52 disposed on the closed leg of the U-shaped manometer 48. Those blocks represent pressure sensors preferably of the optical type including a source of light and a phototransistor disposed in opposite relationship to sandwich a mercury column in the closed leg of the manometer 48 therebetween although they are not illustrated.

The pressure sensor 50 is responsive to the transit of the extremity of the mercury column past the associated source to open the electromagnetic valve 34 while the pressure sensor 52 is responsive to the transit of the extremity of the mercury column past the associated source to stop the vacuum pump 40 in order to prevent the pressure in the container from excessively decreasing. The positions of the pressure sensors 50 and 52 are controllable along the closed leg of the "U" 48 in order to preset any desired magnitude of reduced pressure or vacuum within the container 12 under which the valve 34 and pump 40 are opened and stopped respectively. It is to be understood that the U- shaped mercury manometer 50 may be replaced by any suitable type of pressure gauge.

The reference numeral 54 shown in FIG. 1 designates an operating switch for closing and opening the associated electric equipment (not shown) including the motor 40.

In the arrangement as shown in FIG. 2 it is assumed that workpieces (not shown) to be cast or encapsulated are put in place within the mold cavities 22, one workpiece for each cavity and that the pot 30 is filled with a liquid mixture having predetermined proportions of a synthetic resin to be cast and a hardener therefor at room temperature with the valves 34 and 42 respectively in a closed position and in a position where the interior of the container 12 communicates with the vacuum pump 40. It is also assumed in the arrangement that the pressure sensors 50 and 52 are disposed in their desired positions on the manometer 48. In other words, the arrangement as shown in FIGS. 1 and 2 is ready for the casting operation.

Under the assumed condition, the switch 54 is closed to operate the motor 40 to cause the vacuum pump 40 to evacuate the interior of the container 12. When the interior of the container 12 reaches a predetermined reduced pressure or vacuum corresponding to the position of the pressure sensor 50 along the closed leg of the U-shaped manometer 48, the electromagnetic valve 34 is brought into its open position through a control circuit (not shown). This permits the liquid mixture of synthetic resin and hardener therefor from the pot 30 to be poured or sucked into the mold 20 through the conduit 32, the open valved 34 and the nozzle 36 until all the cavities 22 of the mold 20 are completely filled with the liquid mixture to encapsulate the respective workpieces (not shown) disposed therein. If the liquid mixture in the pot 30 appreciably decreases in its level during that pouring operation then the combined weighing and mixing unit 38 replenishes the pot 30 with the mixture of resin and hardener as above described.

At the end of the pouring operation, the surplus mixture overflows into the outer surface of the mold 20 through the escaping ports 26. This is sensed by the limit switch 28. The limit switch 28 operates to close the valve 34 and turn the valve 42 to its position where the interior of the container 12 communicates with the air feed conduit 44 while at the same time the operation of the motor 46 and therefore the pump 40 is stopped. Thus the interior of the container 12 gradually increases in pressure until it reaches the surrounding pressure. At that time the cover plate 14 is automatically brought into its open position as illustrated in FIG. 1. It is to be understood that the limit switch (28) may be replaced by any suitable type of photo-transistor or electromagnetic relay.

Then the mold 20 is removed from the container 12 and the nozzle 36 is plugged. The mold 20 is left as is until the resin solidifies within the mold cavities 22. Thereafter the resulting cast or encapsulated workpieces can be ejected from the mold cavities 22.

Then another set of workpieces to be encapsulated is placed within the now empty mold or a new mold. The process as above described is repeated with the mold disposed in the container 12. During the casting operation, the pressure in the container 12 may decrease below a predetermined magnitude represented by the position of the pressure sensor 52 along the manometer 48. This enables the pressure sensor 52 to stop the motor 46 as above described thereby to prevent the pressure in the container from falling excessively.

The invention is effectively applicable to a wide variety of workpieces and particularly to electronic parts and elements to be encapsulated with synthetic resins. Suitable examples of the synthetic resins involve epoxy resins, polyurethanes, polyesters, silicon resins, polysulfide synthetic resins etc. Any of these resins may be in or suitably brought into the form of a liquid at room temperature and a suitable hardener is mixed therewith. A liquid mixture thus prepared has preferably a viscosity of about 20,000 centipoises at room temperature.

Figure 3:
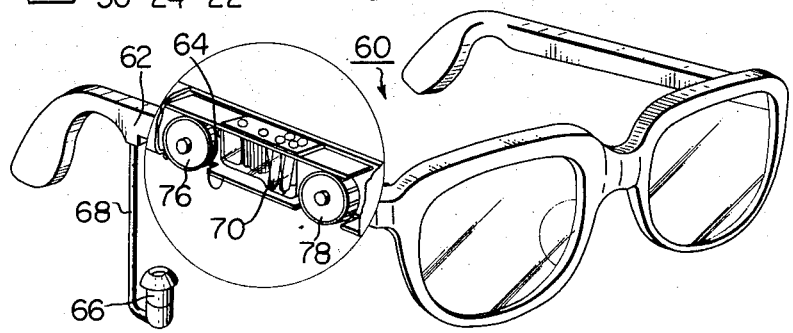
FIG. 3 is a perspective view of spectacles having incorporated thereinto a hearing aid including an encapsulated amplifier unit produced by the device shown in FIG. 1 with a part cut away to illustrate in enlarged scale the manner in which the encapsulated unit is assembled in the spectacles.

FIG. 3 shows spectacles whose side frame has incorporated thereinto an amplifier unit for a hearing aid cast in a synthetic resin according to the invention. Spectacles generally designated by the reference numeral 60 includes a side frame 62, in this case, a left-hand frame as viewed in FIG. 3 into which a cast or encapsulated amplifier unit 64 is incorporated, and an ear chip 66 connected to the frame 62 and also acoustically connected to the amplifier unit 64 thorugh a flexible acoustic tube 68.

Figure 4:
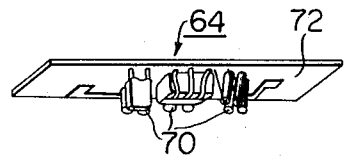
FIG. 4 is a perspective view of the amplifier unit shown in FIG. 3 before it is encapsulated with a synthetic resin.

As shown in FIG. 4, a plurality of electric components 70 are disposed on a supporting plate 72 of any suitable electrically insulating material to form the main body of the amplifier unit 64. The arrangement of FIG. 4 is then embedded in a block 74 of any suitable electrically insulating resin as shown in FIG. 5 in readiness for being incorporated into the spectacles.

Figure 5:
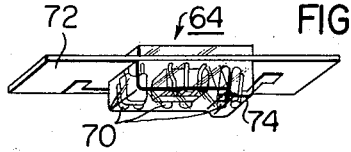
FIG. 5 is a view similar to FIG. 4 but illustrating the amplifier unit after having been encapsulated.
Figure 6:
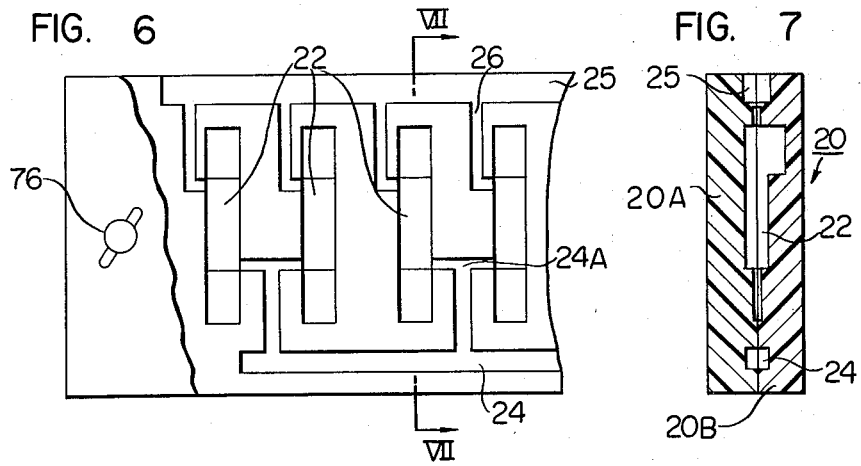
FIG. 6 is a fragmental plan view of a casting mold suitable for casting the amplifier units shown in FIG. 4 with a part broken away to illustrate an arrangement of mold cavities.
Figure 7:
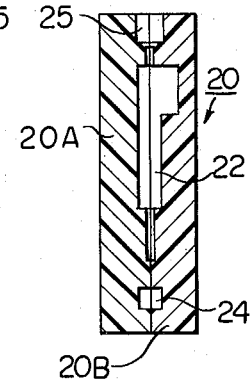
FIG. 7 is a fragmental sectional view taken along the line VII — VII of FIG. 6.

In order to complete the arrangement of FIG. 5, one can preferably use a casting mold as shown in FIGS. 6 and 7 although the invention is not limited thereby or thereto. A casting mold generally designated by the reference numeral 20 includes an upper half 20A, a lower half 20B and a plurality of mold cavities 22 disposed in spaced aligned relationship. In the example illustrated, the greater part of each cavity 22 is formed in the lower mold half 20B so that the one set of the amplifier components 70 and its supporting plate 72 are adapted to be disposed in the lower half 20B with the surface of the lower half substantially flush with that face of the supporting plate opposite to the amplifier components. On the other hand, the upper mold half 20A includes one shallow recess superposing each cavity portion of the lower half 20B except for the recess for each end portion of the supporting plate.

Further a runner 24 is disposed on one edge portion of the lower mold half 20B connected to a plurality of gates 24A each communicating with an individual pair of adjacent cavities 22. The runner 24 is adapted to be connected at one end to the associated pouring nozzle such as shown by 36 in FIG. 2. The cavities 22 each are provided with an escaping port 26 openning into a dead head or riser 25 running along the other edge of the mold 20 (see FIG. 7).

The amplifier units 60 are fixedly placed in the cavity portions formed in the lower mold half 20B and then the upper mold half 20-A is superposed onto and fastened to the lower half 20B by fastening bolts 76 (only one of which is illustrated). The mold 20 thus assembled is placed in the container 12 in the manner as above described in conjunction with FIG. 2 and is ready for a casting operation.

It has been found that such an amplifier unit is preferably encapsulated with an epoxy resin known as "Araldite D" (trate mark) or "CY200" sold by the Chiba Co. a suitable hardener for such a resin is what is commercially available as "HY956" from the same company. The resin was thoroughly mixed with the hardener in a mixing ratio of 100 to 18 to form a liquid having a viscosity of 1,800 centipoises at 20° C.

The process as above described in conjunction with FIGS. 1 and 2 was repeated with the resin-hardener mixture this prepared. The mixture was sucked into the mold 20 under a reduced pressure or a vacuum corresponding to 80 mm Hg whereby the amplifier units such as shown in FIG. 5 were formed.

The amplifier unit 64 thus encapsulated can be incorporated into the side frame 62 of the spectacles 60 along with accessories including a miniature microphone and receiver. Among the accessories, a volume control 76 and a switch 78 are shown, by way of example, in both sides of the encapsulated unit 64 in FIG. 3. Also a battery (not shown) may be disposed on the free end portion of the side frame 64.

The invention will now be described in terms of bimophic piezoelectric elements composed of Rochelle salt. It is well known that such elements are required to be completely isolated from the air because Rochelle salt forming such piezoelectric element is deliquescent and efflorescent.

Figure 8:
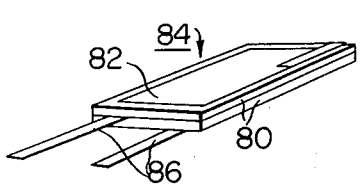
FIG. 8 is a perspective view of a bimorphic piezoelectric element formed of Rochelle salt to which the invention is effectively applied.

Bimorphic piezoelectric elements of Rochelle salt are commonly formed in a structure as shown in FIG. 8. More specifically, a pair of piezoelectric pieces 80 with electrodes 82 (only one of which is illustrated) are cemented together into a bimorphic structure 84 including a pair of leads 86 formed of any suitable metallic foil. It is to be noted that the arrangement of FIG. 8 includes no means for positioning it within the associated cavity such as shown by 22 in FIG. 2. To avoid this objection, the bimorphic element 84 can be effectively completely coated with a plastic film formed, for example, of a vinylidene chloride resin and provided on the opposite edges having the longest spacing therebetween with projections for positioning purpose. For example, the element 84 is shown in FIG. 9 as including such a film 88 provided with a pair of projections 90 each having an extremity spaced away from the associated faces of the element by distances "d."

Figure 9:
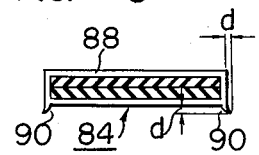
FIG. 9 is a cross sectional view of the element of FIG. 9 shown in an intermediate step of the casting process according to the invention.
Figure 10:
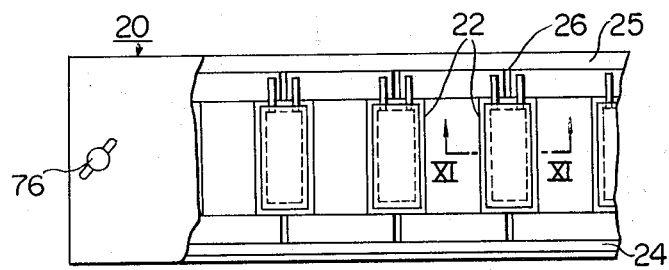
FIG. 10 is a view similar to FIG. 6 but illustrating a mold suitable for casting elements such as shown in FIG. 8.
Figure 11:
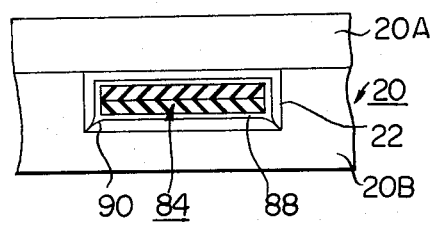
FIG. 11 is a fragmentary cross sectional view of the mold shown in FIG. 10 as taken along the line XI — XI of FIG. 10.

In FIGS. 10 and 11 wherein like reference numerals designate the components corresponding to those illustrated in FIGS. 6 and 7, a mold 20 is shown as having a plurality of spaced aligned cavities 22 disposed in its lower half 20B which cavities have the configuration and dimension just sufficient to accommodate the elements of FIG. 9 therein. Thus the element 84 of FIG. 9 can easily centered within the associated mold cavity 22 by having the projections 90 abutting against the lower opposite edges of the cavity 22. The process as previously described in conjunction with FIGS. 1 and 2 are repeated with the mold 22 having positioned therein the piezoelectric elements 84 as shown in FIGS. 10 and 11 through the use of the resin and hardener identical to those described in conjunction with FIGS. 3 through 7. However, 100 parts be weight of the resin was mixed with 20 parts by weight of the hardener and the resulting mixture was sucked into the mold under a reduced pressure of 40 mm Hg. Also a timer (not shown) was used to time out the pouring time of 15 seconds with the limit switch 28 omitted. Then the valves 34 and 42 were manually operated to return the container 12 to the surrounding pressure.

It is to be noted that the limit switch may be replaced by any suitable switching means responsive to the overflow of the liquid mixture from the mold through the escaping ports to actuate the valves 34 and 42 and stop the motor 46 and therefore vacuum pump 40.

Since the resin-hardener mixture as above described has a vapor pressure of $1.5 \times 10^{-6}$ mm Hg at 20° C, the magnitude of reduced pressure or vacuum just specified causes no physical change in the elements being encapsulated. Also the casting operation is performed at room temperature thereby preventing the Rochelle salt from being adversely affected. Therefore the piezoelectric elements are completely encapsulated with the resin.

The invention has several advantages. For example, casting can be effected at lower temperatures such as room temperature as long as a resin-hardener mixture involved is in the form of a liquid sufficiently fluidal at such temperatures. Therefore the invention is particularly suitable for potting, encapsulating or sealing physically and/or chemically fragile or delicate electronic parts and elements such as piezoelectric elements made of Rochelle salt as above described. Also the invention is excellent in mass productivity, workability and preservation of performance of the products.

What is claimed is:

1. A device for casting a synthetic mixture of two liquid synthetic resins in predetermined proportions at room temperature and at a reduced pressure to encapsulate workpieces, comprising:

a container capable of having a vacuum created therein;

a mold having a plurality of cavities, each cavity capable of having a workpiece located therein and removably disposed within said container;

an injection pipe communicating with the bottom of each of the cavities of said mold and adapted to inject the mixture of synthetic resins into the plurality of mold cavities a normally closed first electromagnetic valve disposed within said injection pipe for controlling the flow of the synthetic resin mixture;

a vacuum pump operatively connected to said container for evacuating said container;

a second electromagnetic valve operatively disposed between said vacuum pump and said container; and pressure control means for sensing a predetermined vacuum within said container and for sensing the complete filling of the mold cavities with the mixtures of synethetic resins for automatically controlling said vacuum pump and said first and second electromagnetic valves, said pressure control means including a plurality of escaping ports disposed in said mold, one of said plurality of escaping ports connecting an associated mold cavity to the outer surface of the mold and switching means disposed adjacent a selected one of the escaping ports within the container to respond to the overflow of the liquid mixture from the mold through the selected escaping port to close the first electromagnetic valve while stopping the vacuum pump and turning the second electromagnetic valve to connect said container with the surrounding environment.

* * * * *